(12) United States Patent
Brady et al.

(10) Patent No.: US 7,336,353 B2
(45) Date of Patent: Feb. 26, 2008

(54) CODING AND MODULATION FOR HYPERSPECTRAL IMAGING

(75) Inventors: David J. Brady, Durham, NC (US); Michael E. Gehm, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 11/580,925

(22) Filed: Oct. 16, 2006

(65) Prior Publication Data

US 2007/0097363 A1    May 3, 2007

Related U.S. Application Data

(60) Provisional application No. 60/726,655, filed on Oct. 17, 2005.

(51) Int. Cl.
*G01J 3/28* (2006.01)
*G01J 3/04* (2006.01)

(52) U.S. Cl. .................... 356/310; 356/328; 356/330

(58) Field of Classification Search ............... 356/310, 356/330
See application file for complete search history.

(56) References Cited

U.S. PATENT DOCUMENTS

| 5,627,639 A * | 5/1997 | Mende et al. ............... 356/310 |
| 7,248,358 B2 * | 7/2007 | Geshwind et al. .......... 356/310 |
| 7,301,625 B2 * | 11/2007 | Brady et al. ................ 356/310 |

* cited by examiner

*Primary Examiner*—F. L Evans
(74) *Attorney, Agent, or Firm*—Kasha Law PLLC; John R. Kasha

(57) ABSTRACT

Embodiments of the present invention relate to systems and methods for spectral imaging. In one embodiment, an image of the scene is formed on a coded aperture of a spectrometer. A coded image from the coded aperture is detected on a two-dimensional detector array of the spectrometer through a spectrally dispersive element of the spectrometer. Data from the two-dimensional detector array is collected as the coded image is varied over time. The spectral image is estimated from the data collected and the variation of the coded image over time. The data collected is varied over time through translation, rotation, and defocus.

34 Claims, 16 Drawing Sheets

200

CODING AND MODULATION FOR HYPERSPECTRAL IMAGING

CROSS-REFERENCE TO RELATED APPLICATION

This application claims the benefit of U.S. Provisional Patent Application Ser. No. 60/726,655 filed Oct. 17, 2005, which is herein incorporated by reference in its entirety.

BACKGROUND OF THE INVENTION

1. Field of the Invention

Embodiments of the present invention relate to systems and methods for hyperspectral imaging using static coded aperture spectrometers. More particularly, embodiments of the present invention relate to systems and methods in which translation, rotation, and defocus is combined with coded aperture spectrometers to implement hyperspectral imaging with high optical efficiency, with low component and design cost, and without the missing cone problem.

2. Background Information

Traditional digital imaging techniques produce images with scalar values associated with each spatial pixel location. In imaging spectroscopy, these scalar values are replaced with a vector containing the spectral information from that spatial location. The resulting datacube is, therefore, three-dimensional (two spatial dimensions and one spectral dimension).

Spectral imaging has traditionally focused on environmental remote sensing and military target recognition tasks. In recent years, however, there has been a dramatic growth in biophotonics applications, and with that growth has come an increased interest in spectral imaging for biological applications (especially those with security applications).

The number of data points, or voxels, in the hyperspectral datacube is typically large. For example, a 1000 by 1000 pixel image with 100 spectral channels corresponds to a datacube with $10^8$ voxels. As a result of both the large number of voxels and the geometric complexity associated with sampling the three-dimensional (3D) datacube on two-dimensional (2D) optoelectronic detector arrays, it is generally necessary to scan some system parameter as a function of time or to use multiple apertures to fully characterize the datacube. Selection of a spatial, spectral, and temporal sampling strategy and integration of the sampling strategy with physical design and image estimation algorithms are the primary challenges addressed in the design of hyperspectral imaging systems.

Hyperspectral imagers may be classified as isomorphic systems, in which each detected measurement corresponds to a specific voxel in the datacube, or multiplex systems, in which each measurement corresponds to a linear combination of voxel values. Isomorphic systems have been constructed using tunable filters and filter arrays, spectrally sensitive detector arrays, and push broom dispersive spectrometers. The simplest type of isomorphic system combines a tomographic (rotational scanning) or pushbroom (linear scanning) front-end with a traditional slit-based dispersive spectrometer. Isomorphic systems are relatively simple to construct, although the numerical aperture of tunable filters is in some cases limited. The disadvantage of isomorphic systems is that photon efficiency is inversely proportional to spatiospectral resolution. Poor optical efficiency results in relatively long acquisition times and a poor signal to noise ratio (SNR).

There have been a number of ingenious solutions to the light collection problem of isomorphic systems over the years. Two very advanced solutions are the scanning-Michelson Fourier-transform spectrometers, and multiplexed pushbroom designs based on digital micro-mirror (DMM) technology. Both approaches have proven highly successful. However, they involve expensive components that are not terribly robust.

Multiplex systems have been constructed using Fourier transform interferometry, Hadamard transform dispersion, as well as spectral tomographic approaches. Multiplex data must be digitally processed to estimate the datacube. The advantage of multiplexing is that the throughput, defined as the ratio of the optical power entering the system aperture to detected power, may be as high as 50-100%. While high throughput is not a panacea, higher throughput is generally associated with better sensitivity and higher SNR.

Functional performance, resolution, system cost, computational complexity and stability, weight, volume, and many other metrics arise in comparing isomorphisms and multiplexing schemes. Previous multiplexing designs have been constrained by high component and design cost associated with interferometric stability for Fourier transform systems, the relatively complex and expensive challenges of Hadamard systems based on dynamic spatial light modulators, as well as the "missing cone" problem associated with spectral tomography. The missing cone describes the dependence of spectral resolution on image spatial frequency. As a result of the missing cone, ill-posed inference techniques are necessary to estimate the spectra of coarse features in spectral tomography images.

In view of the foregoing, it can be appreciated that a substantial need exists for systems and methods that can advantageously perform hyperspectral imaging with a high optical efficiency, with a low component and design cost, and without the missing cone problem.

BRIEF SUMMARY OF THE INVENTION

One embodiment of the present invention is a method for estimating a spectral image of a scene using translation. An image of the scene is formed on a coded aperture of a spectrometer. A coded image from the coded aperture is detected on a two-dimensional detector array of the spectrometer through a spectrally dispersive element of the spectrometer such that cross sections of the coded aperture along a direction normal to a dispersion direction are independent. Data from the two-dimensional detector array is collected as the coded image is varied over time. The spectral image is estimated from the data collected and the variation of the coded image over time. The coded image is varied over time by translating the spectrometer relative to the scene, for example.

Another embodiment of the present invention is a method for estimating a spectral image of a scene using rotation. An image the scene is formed on a coded aperture of a spectrometer. A coded image from the coded aperture is detected on a two-dimensional detector array of the spectrometer through a spectrally dispersive element of the spectrometer. Rotation is used to produce time varying data collected by the two-dimensional detector array. The spectral image is estimated from the data collected and the rotation over time.

Another embodiment of the present invention is a method for estimating a spectral image of a scene using defocus. An astigmatically defocused image is formed on a coded aperture of a spectrometer. A coded image from the coded aperture is detected on a two-dimensional detector array of the spectrometer through a spectrally dispersive element of the spectrometer. The scene is rotated relative to an astigmatism of the astigmatically defocused image to produce time varying data collected by the two-dimensional detector array. The spectral image is estimated from the data collected, the astigmatic defocus of the image, and the rotation of the scene over time.

Another embodiment of the present invention is a spectral imager that uses translation. The spectral imager includes a spectrometer. The spectrometer includes an optical preprocessor, a coded aperture, a spectrally dispersive element, a two-dimensional detector array, and a processor. The optical preprocessor forms an image of a scene on the coded aperture. A coded image from the coded aperture is detected on the two-dimensional detector array through the spectrally dispersive element such that cross sections of the coded aperture along a direction normal to a dispersion direction are independent. Data is collected from the two-dimensional detector array as the coded image is varied over time. The processor estimates a spectral image of the scene from the data collected and the variation of the coded image over time. The coded image is varied over time by translating the spectrometer relative to the scene, for example.

Another embodiment of the present invention is a spectral imager that uses rotation. The spectral imager includes a spectrometer. The spectrometer includes an optical preprocessor, a coded aperture, a spectrally dispersive element, a two-dimensional detector array, and a processor. The optical preprocessor forms an image of a scene on the coded aperture. A coded image from the coded aperture is detected on the two-dimensional detector array through the spectrally dispersive element. Rotation is used to produce time varying data collected by the two-dimensional detector array. The processor estimates a spectral image of the scene from the data collected and the rotation over time.

Another embodiment of the present invention is a spectral imager that uses defocus. The spectral imager includes an optical preprocessor, a coded aperture, a spectrally dispersive element, a two-dimensional detector array, and a processor. The optical preprocessor forms an astigmatically defocused image of a scene on the coded aperture. A coded image from the coded aperture is detected on the two-dimensional detector array of the spectrometer through the spectrally dispersive element. The scene is rotated relative to an astigmatism of the astigmatically defocused image to produce time varying data collected by the two-dimensional detector array. The processor estimates the spectral image of the scene from the data collected, the astigmatic defocus of the image, and the rotation of the scene over time.

Figure 1:
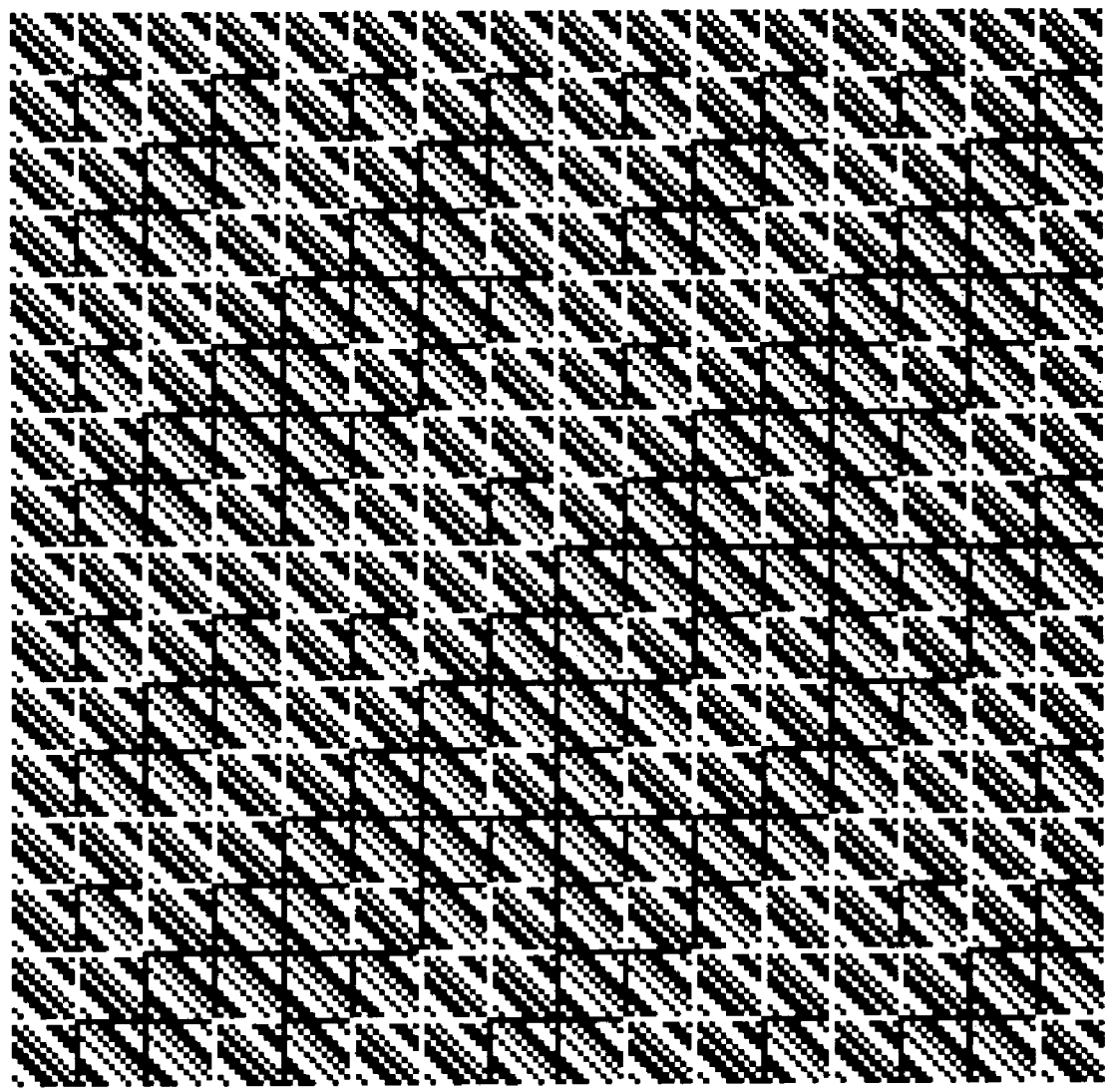
FIG. 1 is a diagram of an exemplary non-circulant S-matrix mask 100, in accordance with an embodiment of the present invention.
Figure 1:
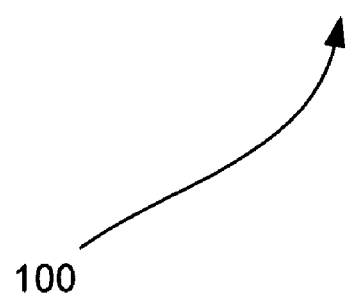

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

One embodiment of the present invention is a multiplex system for hyperspectral imaging using a static coded aperture spectrometer. The system is not interferometric and does not require extraordinary stability or alignment precision.

The system does not encounter the missing cone problem and is capable of well conditioned estimation of spatial and spectral features of arbitrary size and distribution. The basic design of the system is based on a 2D coded aperture static multimode multiplex spectrometer (MMS). A static MMS is described in U.S. Pat. No. 7,092,101, which is herein incorporated by reference in its entirety. A 2D coded aperture static MMS is described in U.S. patent application Ser. No. 11/334,546 filed Jan. 19, 2006, which is herein incorporated by reference in its entirety.

Coded apertures are used to increase the throughput of imagers and spectrometers. Coded apertures for use in spectroscopy were proposed more than 50 years ago. Although early studies were limited by the quality of detectors and especially by the lack of high quality detector arrays, work on coded aperture designs has continued at a steady pace since their invention. As the mathematical treatments gained sophistication, the appeal of apertures based on Hadamard matrices became apparent and the majority of coded aperture spectrometers became Hadamard transform spectrometers. While early efforts typically involved discrete detector elements and pairs of static coded apertures, more recent systems have focused on 2D detector arrays and dynamic spatial light modulators.

Because coded apertures can block half or more of the light incident on the system, the use of coded apertures to increase optical efficiency is somewhat counter intuitive. Despite this paradox, obscurants have proven useful in many systems. By breaking the shift invariance common to most optical systems, an obscurant can dramatically increase the conditioning of a sampling system. This effect is most obvious in spectroscopy, where a coded aperture as a spatial filter dramatically increases the throughput relative to slit-based filters, but is perhaps most dramatic in the elimination of the missing cone from imaging systems. A coded aperture can be viewed as a high frequency image feature rendering the missing cone moot.

Coded apertures have been used in both monochromatic and spectral imaging systems. Monochromatic imaging systems generally use coded apertures in lens-less geometries as alternatives to a pinhole. A monochromatic coded aperture has been generalized to multiple dimensional sources in the case of reference structure tomography. Monochromatic coded apertures have not been widely applied, however, because isomorphic focal imaging achieves both very high photon efficiency and sensor data entropy. Efficient sensing is not generally possible in the case of spectral imaging, however.

Coded aperture spectral imaging has relied almost exclusively on Hadamard codings. Two approaches have been utilized: (1) dynamically variable spatial light modulators for row-wise encoding of the Hadamard transform and (2) circulant Hadamard matrices. Using dynamically variable spatial light modulators is complex and, therefore, expensive. Using static transmission masks as encoding masks is a much less expensive approach. Circulant matrices have been exclusively applied in previous studies of static encoding masks. For example, circulant matrices were used, for example, in U.S. Pat. No. 5,627,639 to Mende et al., which is herein incorporated by reference. The specific use of circulant matrices is motivated by a favorable review of two properties of circulant forms. First, a circulant mask is "self-supporting," meaning that holes can be used instead of transmission windows. Second, row-wise translation of the mask produces a full row-wise Hadamard encoding. With modern photolithographic mask and thin film technologies, a self-supporting design is no longer a compelling constraint.

Another embodiment of the present invention is the use of a non-circulant Hadamard or a non-Hadamard based coded aperture in a hyperspectral imager. Non-circulant Hadamard and non-Hadamard encodings can outperform simple circulant encodings in many applications. Primary advantages of non-circulant Hadamard and non-Hadamard encodings include removing the need to translate the input scene across all rows of the encoding mask, insensitivity to alignment errors and other distortions, and the ability to decouple the size of the mask from the number of spectral channels multiplexed.

FIG. 1 is a diagram of an exemplary non-circulant S-matrix mask 100, in accordance with an embodiment of the present invention.

Figure 2:
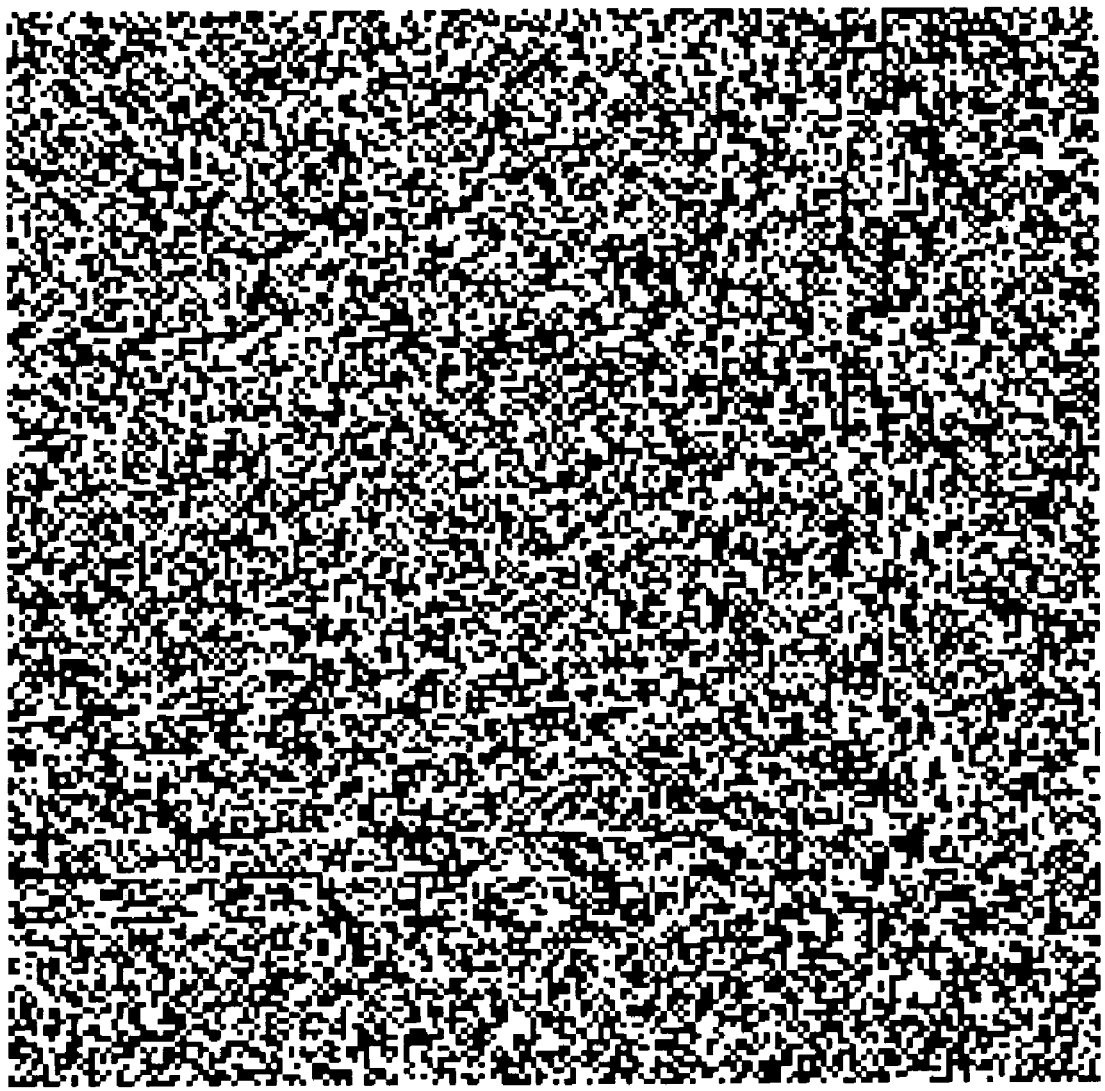
FIG. 2 is a diagram of an exemplary non-circulant S-matrix mask 200 where the rows and columns have been randomly shuffled, in accordance with an embodiment of the present invention.

FIG. 2 is a diagram of an exemplary non-circulant S-matrix mask 200 where the rows and columns have been randomly shuffled, in accordance with an embodiment of the present invention.

Figure 3A:
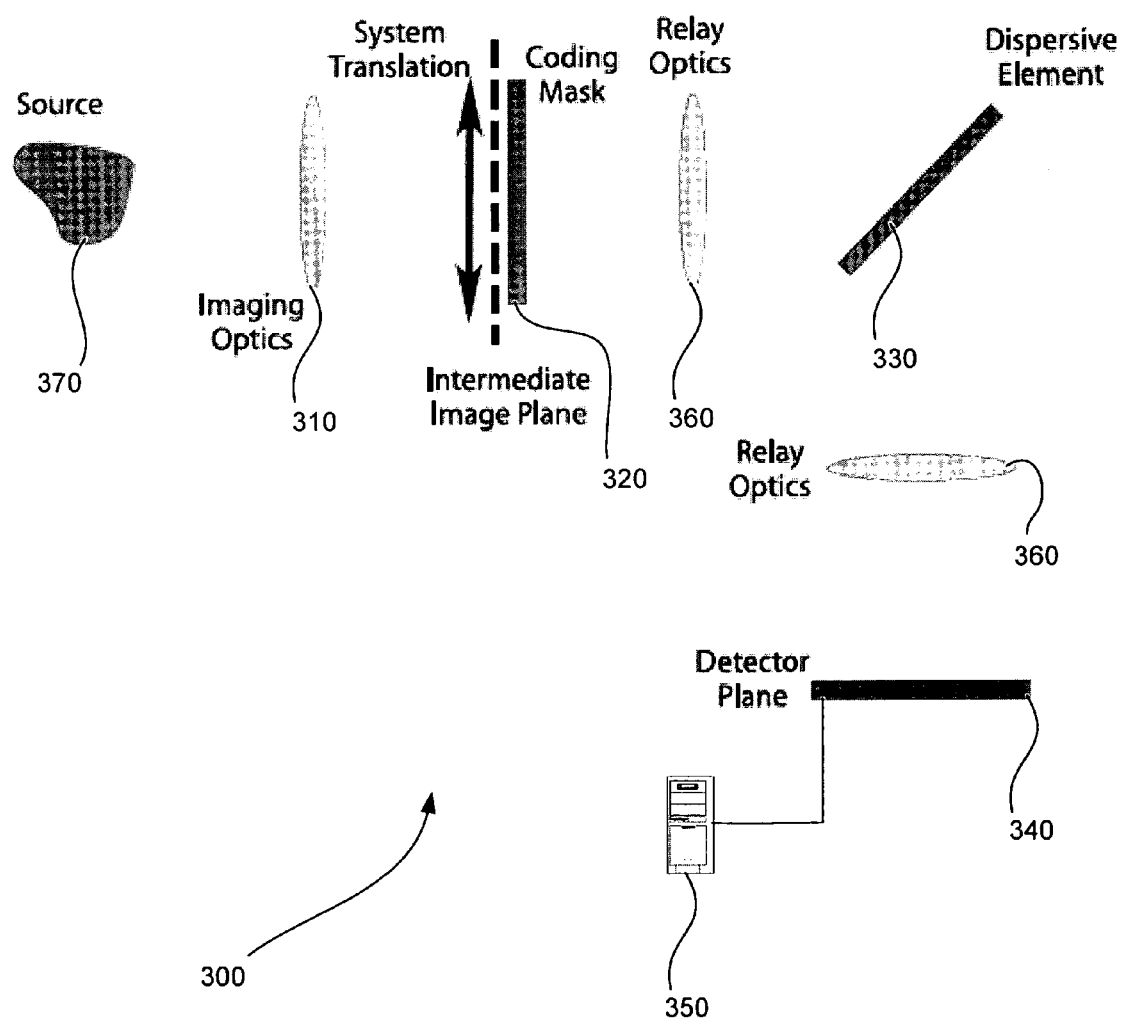
FIG. 3A is a schematic diagram of a coded aperture spectral imaging system based on translation, in accordance with an embodiment of the present invention.

FIG. 3A is a schematic diagram of a coded aperture spectral imaging system 300 based on translation, in accordance with an embodiment of the present invention.

System 300 consists of optical preprocessor 310, coded aperture 320, dispersive element 330, detector array 340, and processor 350. System 300 also includes relay optics 360 and source object 370. Dispersive element 330 can be, but is not limited to, a holographic grating or a diffraction grating. System 300 can be used as a spectral imager. The datacube is detected on two-dimensional detector array 340 with a time varying system parameter. Temporal variation of image position, defocus, and rotation are considered.

One embodiment of system 300 is a spectral imager that uses translation. The spectral imager includes a spectrometer. The spectrometer includes optical preprocessor 310, coded aperture 320, spectrally dispersive element 330, two-dimensional detector array 340, and processor 350. Optical preprocessor 310 forms an image of a scene on coded aperture 320. A coded image from coded aperture 320 is detected on two-dimensional detector array 340 through spectrally dispersive element 330 such that cross sections of coded aperture 320 along a direction normal to a dispersion direction are independent. Data is collected from two-dimensional detector array 340 as the coded image is varied over time. Processor 350 estimates a spectral image of the scene from the data collected and the variation of the coded image over time. Processor 350 estimates a spectral image of the scene by isolating independent spatial and spectral components from the collected data by forming a mathematical inner product between columns of the collected data and an analysis function, for example.

There are an infinite number of unique codes that can be used and, therefore, an infinite number of analysis functions that can be used. For example, if the m-th column of coded aperture 320 is defined by $$\tau_m = \frac{1}{2}\left(1 + \cos\left(m\frac{y\pi}{Y}\right)\right) \quad (1)$$

then the m-th column of the appropriate analysis function is defined by the following equation.

$$\tilde{\tau}_m = 2\cos\left(m\frac{y\pi}{Y}\right) \quad (2)$$

The coded image is varied over time by translating the spectrometer relative to the scene, for example. The spectrometer is a static multiplex multimodal spectrometer, for example.

In another embodiment of the spectral imager, the coded image is varied over time by translating an object in the scene relative to the spectrometer and the spectrometer is stationary.

In another embodiment of the spectral imager, the spectrometer is a spectral imaging microscope and the object is translated using a translation stage under the spectral imaging microscope.

In another embodiment of the spectral imager, the spectrometer is a spectral camera and the coded image is varied over time by slewing the spectrometer relative to the scene.

Another embodiment of system 300 is a spectral imager that uses rotation.

The spectral imager includes a spectrometer. The spectrometer includes optical preprocessor 310, coded aperture 320, spectrally dispersive element 330, two-dimensional detector array 340, and processor 350. Optical preprocessor 310 forms an image of a scene on coded aperture 320. A coded image from coded aperture 320 is detected on two-dimensional detector array 340 through spectrally dispersive element 330. Rotation is used to produce time varying data collected by two-dimensional detector array 340. Processor 350 estimates a spectral image of the scene from the data collected and the rotation over time. The rotation over time is created by rotating the image formed on coded aperture 320 over time, for example.

In another embodiment of the spectral imager, the rotation over time is created by rotating coded aperture 320 over time.

In another embodiment of the spectral imager, the rotation over time is created by rotating dispersive element 330 over time.

In another embodiment of the spectral imager, the rotation over time is created by rotating one or more components of the spectrometer over time. The components of the spectrometer can include, but are not limited to, optical preprocessor 310, coded aperture 320, dispersive element 330, and two-dimensional detector array 340. The spectrometer is a static multiplex multimodal spectrometer, for example.

Figure 3B:
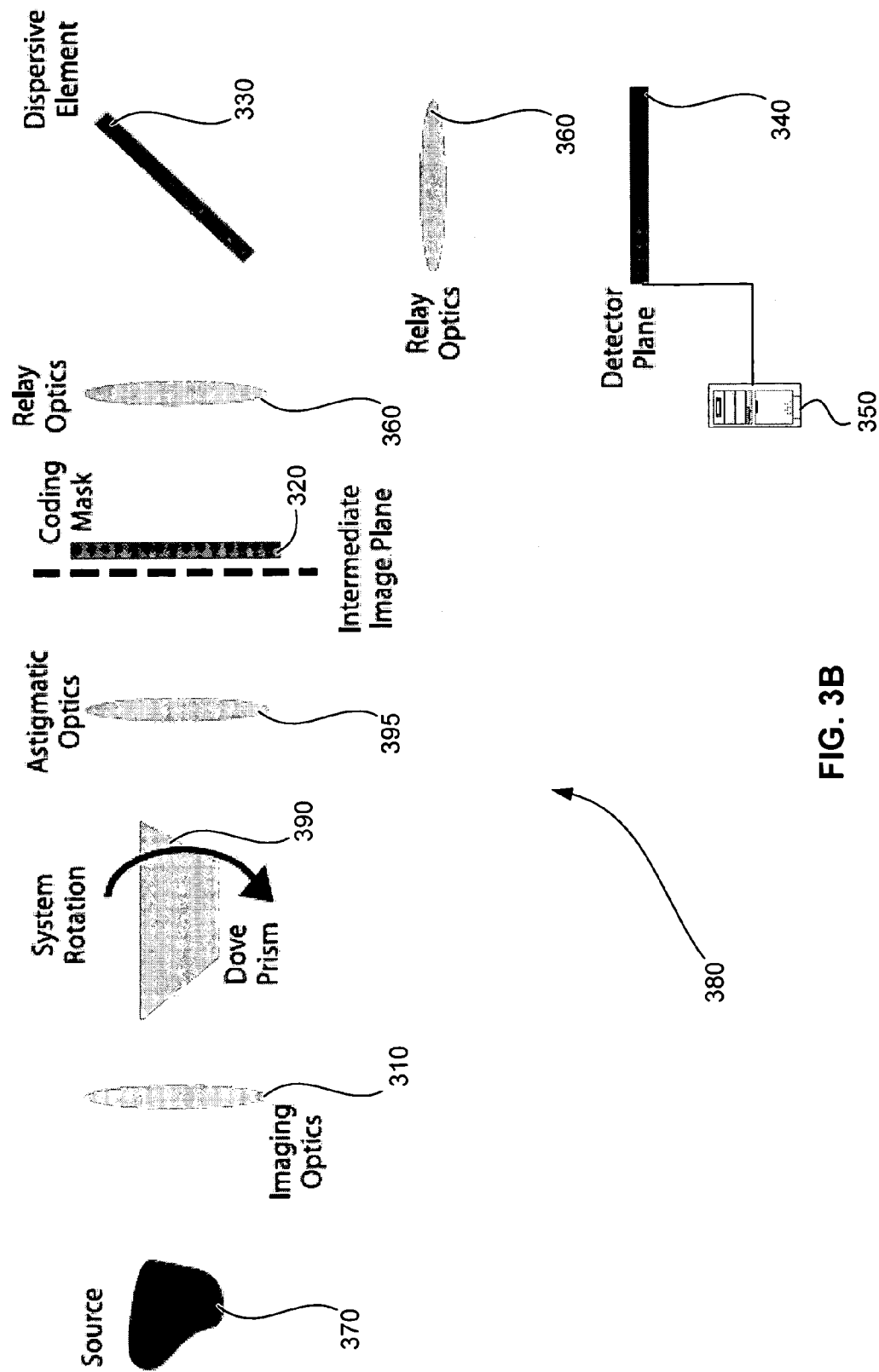
FIG. 3B is a schematic diagram of a coded aperture spectral imaging system based on rotation, in accordance with an embodiment of the present invention.

FIG. 3B is a schematic diagram of a coded aperture spectral imaging system 380 based on rotation, in accordance with an embodiment of the present invention.

System 380 includes optical preprocessor 310, coded aperture 320, spectrally dispersive element 330, two-dimensional detector array 340, dove prism 390, astigmatic optics 395, and processor 350. System 380 also includes relay optics 360 and source object 370. Optical preprocessor 310 forms an astigmatically defocused image of a scene on coded aperture 320. A coded image from coded aperture 320 is detected on two-dimensional detector array 340 of the spectrometer through spectrally dispersive element 330. The scene is rotated using dove prism 395 relative to an astigmatism of the astigmatically defocused image from astigmatic optics 395 to produce time varying data collected by two-dimensional detector array 340.

Processor 350 estimates the spectral image of the scene from the data collected, the astigmatic defocus of the image, and the rotation of the scene over time. Processor 350 estimates the spectral image compressive sampling and decompressive inference to estimate the astigmatically defocused image from the data collected and performing an inverse Radon transform on the estimated astigmatically defocused image to estimate the spectral image, for example. The spectrometer is a static multiplex multimodal spectrometer, for example.

Optical preprocessor 310 is characterized by a spectrally uniform shift invariant impulse response $h(x, y, t)$ and the coding element is characterized by a transmission pattern $\tau(x, y)$. Under this model, system 300 transforms the input datacube $f(x, y, \lambda)$ into measured data $$g(x,y,t)=\iint\int f(x',y',\lambda)h(x-x'-\lambda,y-y',t)\tau(x-\lambda,y)d\lambda dx'dy' \quad (3)$$

where $\lambda$ is wavelength scaled by the dispersion rate, and t is time.

Physically realizable $h(x, y, t)$ and $\tau(x, y)$ are selected so as to make inversion of Eqn. (1) to estimate $f(x, y, \lambda)$ well-posed and computationally attractive. Previous static mask imaging systems have relied exclusively on linear translation of the relative position of the image and coding mask. With linear translation, each detection point on the output plane measures the same set of datacube voxels in each measurement. The sensitivity of a detector element to a given voxel is proportional to a corresponding mask weighting. Letting $f_{ijk}$ represent the $i^{th}$, $j^{th}$ spatial pixel in the $k^{th}$ spectral window and assuming that $h(x, y, t)=\delta(x, y-j' \Delta t)$, Eqn. (3) is written in discrete form for linear translation along y as shown in Eqn. (4).

$$g_{ijj'} = \sum_k \tau_{i-k,j} f_{(i-k)(j-j')k} \quad (4)$$

Previously, the mask code $\tau_{ij}$ has been taken to be the circulant form of the Hadamard S matrix. Under this assumption the vector of data $g_{i(j+j')j'}$ is the Hadamard transform of data along a line through the datacube. Specifically, it is the Hadamard transform of a vector composed of spectral channel 1 in spatial point 1 along x, spectral channel 2 in spatial point 2 along x and so on. Spectral channel 2 in spatial point 1 is captured on the next measurement pixel. The circulant form is required to ensure that a well-formed Hadamard projection is measured on each pixel.

Linear translation along y is not the only way to achieve this mapping. It can also be achieved by discrete two-dimensional translation of a circulant mask. Previously, however, the scale of the mask has been quite modest (i.e., seven or so parallel sampling columns).

Another embodiment of the present invention is a method for varying $h(x, y, t)$ as a function of time using translation that removes the requirement that a full Hadamard transformation be taken to estimate a scene and allows masks of arbitrary aperture size. According to this method, an image is linearly translated at velocity v in the y direction (orthogonal to the dispersion direction). In this case, $h(x, y, t)=\delta(x)\delta(y-vt)$ and $g(x, y, t)$ is defined by Eqn. (5).

$$g(x, y, t)=\int f(x-\lambda,y-vt,\lambda)\tau(x-\lambda,y)d\lambda \quad (5)$$

$g(x, y, t)$ is a datacube in the x, y, t space. Transmission pattern $\tau(x, y)$ is selected such that there exists a complementary function $\tilde{\tau}(x, y)$ that obeys Eqn. (6).

$$\int \tilde{\tau}(x', y)\tau(x, y)dy=\delta(x'-x) \quad (6)$$

Defining $y_p=y-vt$ and integrating $\tilde{\tau}(x, y)g(x, y, t)$ with respect to y along lines of constant $y_p$ produces Eqn. (7).

$$\int \tilde{\tau}(x', y)g\left(x, y, \frac{(y-y_p)}{v}\right)dy = \iint f(x-\lambda, y_p, \lambda)\tilde{\tau}(x', y) \quad (7)$$
$$\tau(x-\lambda, y)d\lambda dy$$
$$= \int f(x-\lambda, y_p, \lambda)\delta(x-x'-\lambda)d\lambda$$
$$= f(x', y_p, x-x')$$

This embodiment includes the assumption that data is collected over a time window sufficient such that for each value of $y_p$ there is a measurement at $t=(y-y_p)/v$. If Y is the range of y in the image, this implies a measurement time $T=Y/v$ sufficient to capture each image voxel at each pixel in the y direction at some instant, meaning that the translation velocity should be less than or equal to the ratio of the pixel spacing to the frame rate, corresponding to approximately a few millimeters per second for an imager operating at video rate.

The wavelength range reconstructed corresponds to the full range of the dispersion plume. The number of wavelength channels is equal to the length of the plume divided by the coded aperture sampling period. The x resolution is approximately equal to the coded aperture sampling feature size.

$\tau(x, y)$ and $\tilde{\tau}(x, y)$ are designed to remove the requirement that each image voxel fully transits the mask. In the fixed $y_p$ coordinate system, Eqn. (8) defines $g(x, y_p, t)$.

$$g(x, y_p, t) = \int f(x-\lambda, y_p, \lambda)\tau(x-\lambda, y_p+vt)d\lambda \qquad (8)$$

Integration against $\tilde{\tau}(x', y_p+vt)$ with respect to time again produces an estimate for $f(x', y_p, x-x')$ if it is assumed that $$\int_0^T \tilde{\tau}(x', y+vt)\tau(x, y+vt)dt \approx \delta(x'-x) \qquad (9)$$

where [0,T] is the time window over which the signal is recorded. It is assumed that $\tau(x, y)$ consists of locally independent functions.

Local orthogonality as described in Eqn. (9) is observed using harmonic masks such as $\tau(x, y)=\tilde{\tau}(x, y)=\cos(\alpha xy)$. The resolution of the approximate sampling is inversely proportional to $\alpha$ and T.

It is useful to consider masks with continuous of half-toned transmission characteristics. A transmission mask can also be formed using polarizing materials to enable simultaneous polarization and spectral analysis. In some cases it is inconvenient to translate the input image or the mask.

Another embodiment of the present invention is a method used to encode data for hyperspectral imaging that includes rotating a coding mask. If a well-formed image is formed on the mask and the mask rotates, the system input/output relationship is $$g(x,y,t) = \int f(x-\lambda, y, \lambda)\tau(x'=(x-\lambda)\cos \omega t - y \sin \omega t, y'=(x-\lambda)\sin \omega t + y \cos \omega t)d\lambda \qquad (10)$$

where $\tau(x', y')$ is the mask transmittance in the un-rotated coordinate system. Since $\tau(x'=(x-\lambda)\cos \omega t - y \sin \omega t, y'=(x-\lambda)\sin \omega t + y \cos \omega t)$ is periodic in time it may be expressed as a Fourier series as shown in Eqn. (11).

$$\tau(x' = (x-\lambda)\cos\omega t - y\sin\omega t, y' = (x-\lambda)\sin\omega t + y\cos\omega t) = \sum_n \tau_n(x-\lambda, y)e^{in\omega t} \qquad (11)$$

g (x, y, t) is similarly periodic in t and substitution in Eqn. (10) yields a relationship between the Fourier series coefficients as shown in Eqn. (12).

$$g_n(x,y) = \int f(x-\lambda, y, \lambda)\tau_n(x-\lambda, y)d\lambda \qquad (12)$$

Figure 4:
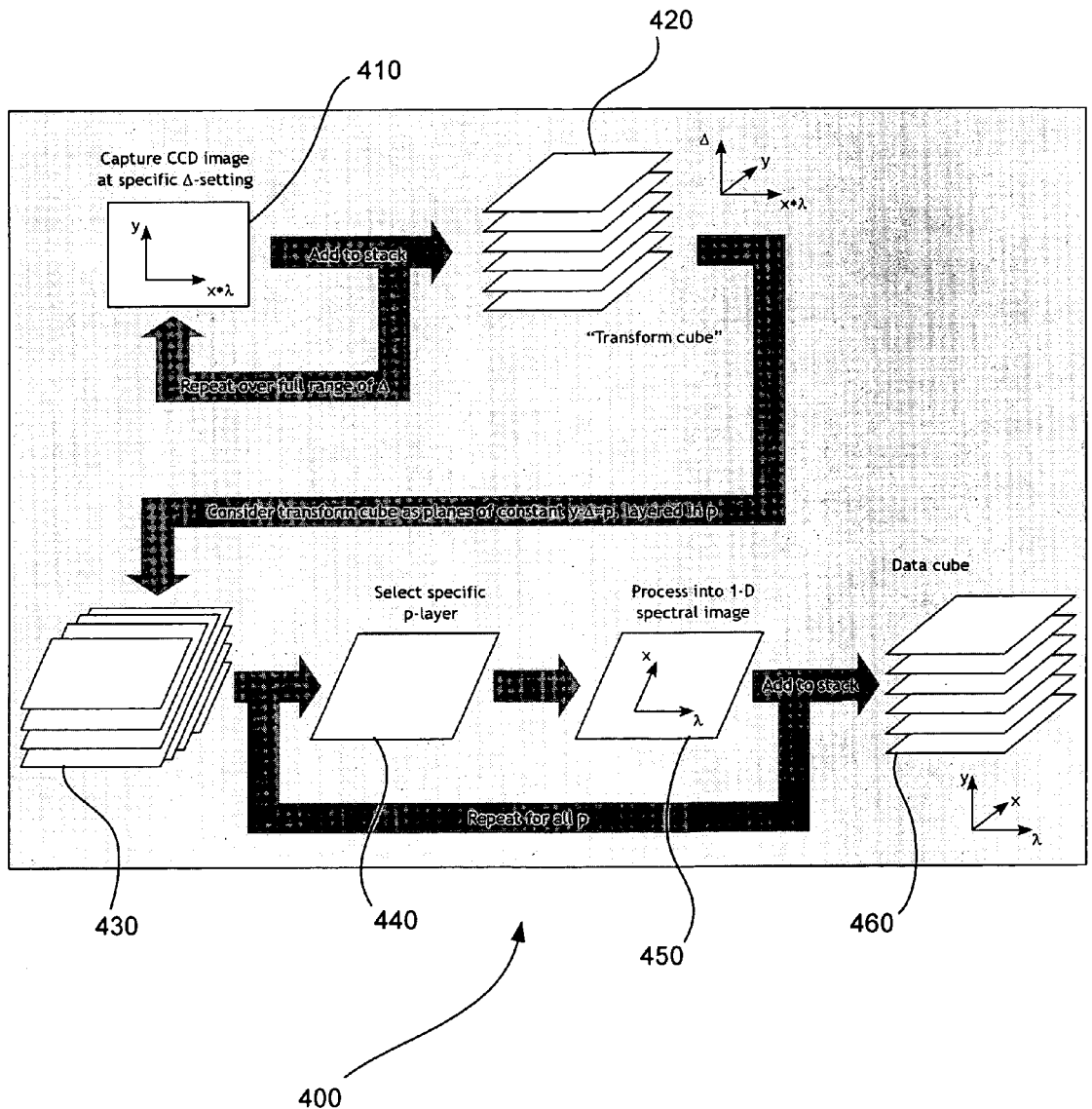
FIG. 4 is a flowchart showing a method of spectral imaging that uses pushbroom inversion, in accordance with an embodiment of the present invention.

FIG. 4 is a flowchart showing a method 400 of spectral imaging that uses pushbroom inversion, in accordance with an embodiment of the present invention.

In step 410 of method 400, an image is captured at a specific location, $\Delta$. The image is captured using a two-dimensional detector array, which is, for example, a charged coupled device (CCD).

In step 420, one or more images from one or more locations are gathered to produce a transform cube.

In step 430, the transform cube is arranged as planes of constant y–$\Delta$=p, layered in p.

In step 440, a specific p layer is selected.

In step 450, the specific p layer is processed into a one-dimensional spectral image.

In step 460, the hyperspectral datacube is created by repeating steps 440 and 450 for all p layers.

In other embodiments of the present invention, the imaging system, a component of the imaging system, or a combination of multiple components of the imaging system can be rotated. For example, the dispersive element can rotate, or the dispersive element and the coding aperture can rotate. Rotation is attractive in sensors starting at a fixed point along an optical axis or in other cases for which translation is unattractive.

Another embodiment of the present invention is a method used to encode data for hyperspectral imaging that includes defocus tomography. An astigmatic impulse response is combined with a coding mask to produce a hyperspectral image or a multi-spatial dimension tomographic image. The impulse response is separable in x and y and the scene rotates at the input as a function of time. If $h_x(x)=\delta(x)$, then the system input/output relationship is defined in Eqn. (13).

$$g(x,y,t) = \int\int h_y(y-y',\lambda)f(x\cos(\omega t)+y'\sin(\omega t)-\lambda, y'\cos(\omega t)-x\sin(\omega t),\lambda)\tau(x-\lambda,y)d\lambda dy' \qquad (13)$$

Transmission pattern $\tau(x, y)$ and impulse response $h_y(y)$ are selected such that there exists a complementary function $\tilde{\tau}(x, y)$ that obeys $$\int \tilde{\tau}(x',y)\tau(x,y)h_y(y-y')dy \approx \delta(x'-x) \qquad (14)$$

for all y' in the range of interest. The result is Eqn. (15), which is the spatial Radon transform of the datacube.

$$\int \tilde{\tau}(x',y)g(x,y,t)dy = \int f(x\cos(\omega t)+y'\sin(\omega t)-(x-x'),y'\cos(\omega t)-x\sin(\omega t),(x-x'))dy' \qquad (15)$$

Another embodiment of the present invention is a method used to encode data for hyperspectral imaging that includes rotating an image on a coding aperture. The system input/output relationship is defined in Eqn. (16).

$$g(x,y,t) = \int f(x\cos(\omega t)+y\sin(\omega t)-\lambda, y\cos(\omega t)-x\sin(\omega t),\lambda)\tau(x-\lambda,y)d\lambda \qquad (16)$$

A coding aperture for this embodiment is defined in Eqn. (17).

$$\tau(x,y) = 1+\cos(2\pi u_0 x) \qquad (17)$$

The spatial Fourier transform of g(x, y, t) is proportional to the integral over $\lambda$ of the convolution of the spatial Fourier transforms of $f(x, y, \lambda)$ and $\tau(x, y)$ in shifted and rotated coordinates. The spatial Fourier transform of the rotating image is $$F\{f(x\cos(\omega t)+y\sin \omega t-\lambda, y\cos(\omega t)-x\sin(\omega t),\lambda)\} = f_r(u\cos(\omega t)-v\sin(\omega t), u\cos(\omega t)+v\sin(\omega t),\lambda)e^{2\pi i(u\cos(\omega t)-v\sin(\omega t))\lambda} \qquad (18)$$

Where $\tilde{f}_r(u, v, \lambda)$ is the Fourier transform of $f(x, y, \lambda)$ with respect to the spatial variables but not the spectral variable. Since the Fourier transform of the harmonic transmission mask consists of Dirac $\delta$ function at u=0 and u=$\pm u_0$, convolution with the periodic transmission mask produces three versions of the Fourier transform centered on shifts of 0 and $\pm u_0$. The functions centered on $\pm u_0$ are further modulated by the phase factor $\exp(2\pi i\lambda u_0)$. In view of the harmonic kernel in $\lambda$ produced by the Fourier shift theorem, integration with respect to λ produces the full three-dimensional Fourier transform of f(x, y, λ). ĝ(u, v, t) is proportional to the sum of f (u', v', k) evaluated at u', v', k as shown in Eqns. (19), (20), and (21).

$$u'=u\cos(\omega t)-v\sin(\omega t)$$

$$v'=u\sin(\omega t)+v\cos(\omega t)$$

$$k=u\cos(\omega t)-v\sin(\omega t), \quad (19)$$

$$u'=(u-u_0)\cos(\omega t)-v\sin(\omega t)$$

$$v'=(u-u_0)\sin(\omega t)+v\cos(\omega t)$$

$$k=u_0+(u-u_0)\cos(\omega t)-v\sin(\omega t), \quad (20)$$

$$u'=(u+u_0)\cos(\omega t)-v\sin(\omega t)$$

$$v'=(u+u_0)\sin(\omega t)+v\cos(\omega t)$$

$$k=(u+u_0)\cos(\omega t)-v\sin(\omega t)-u_0 \quad (21)$$

Figure 5:
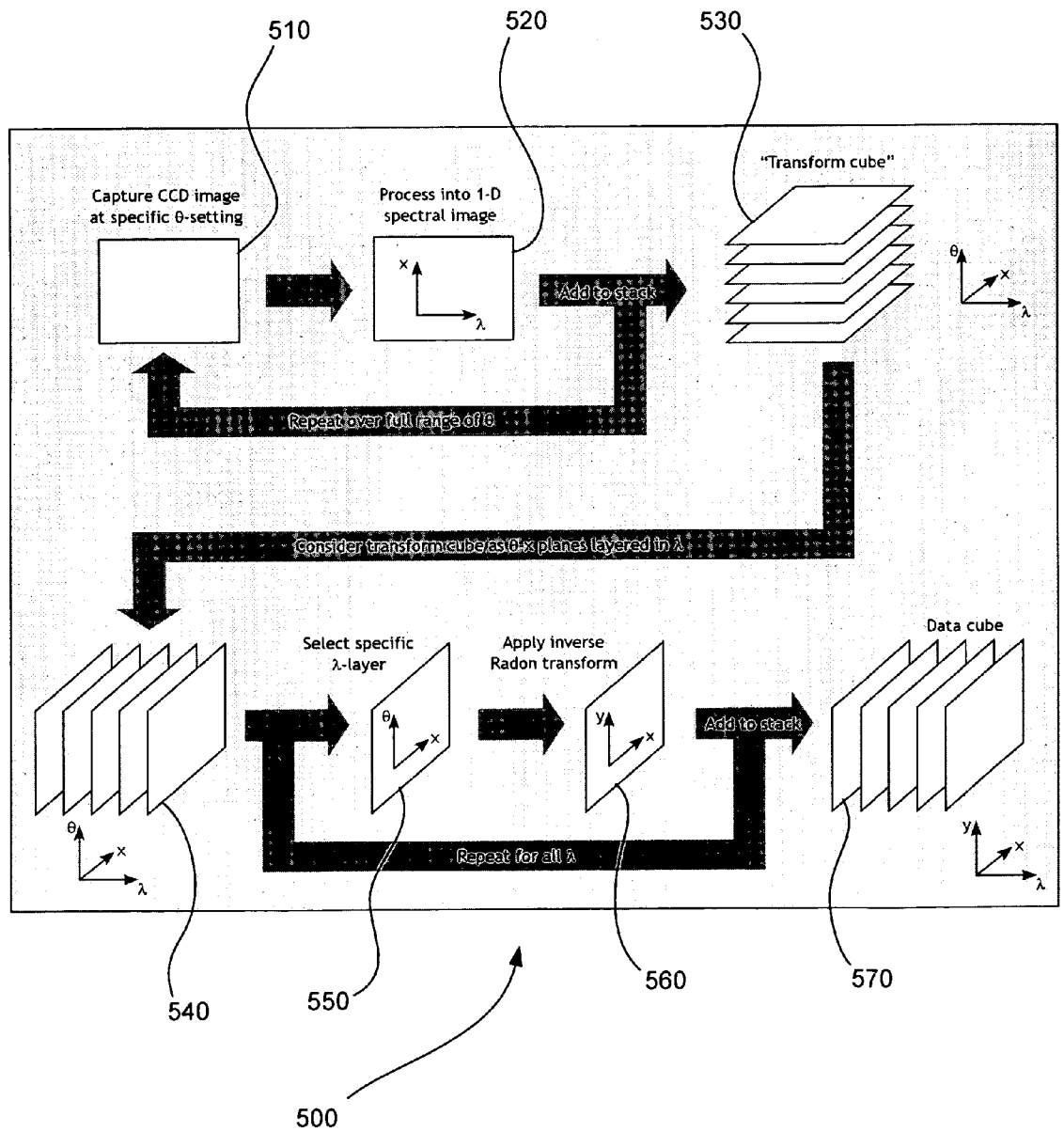
FIG. 5 is a flowchart showing a method of spectral imaging that uses tomographic inversion, in accordance with an embodiment of the present invention.

FIG. 5 is a flowchart showing a method 500 of spectral imaging that uses tomographic inversion, in accordance with an embodiment of the present invention.

In step 510 of method 500, an image is captured at a specific angle, θ. The image is captured using a two-dimensional detector array, which is, for example, a charged coupled device (CCD).

In step 520, the image is processed into a one-dimensional spectral image.

In step 530, one or more spectral images from one or more angles are gathered to produce a transform cube.

In step 540, the transform cube is arranged as θ–x planes, layered in λ.

In step 550, a specific λ layer is selected.

In step 560, the specific λ layer is processed into x, y coordinates using an inverse Radon transform, for example.

In step 570, the hyperspectral datacube is created by repeating steps 550 and 560 for all λ layers.

Figure 6:
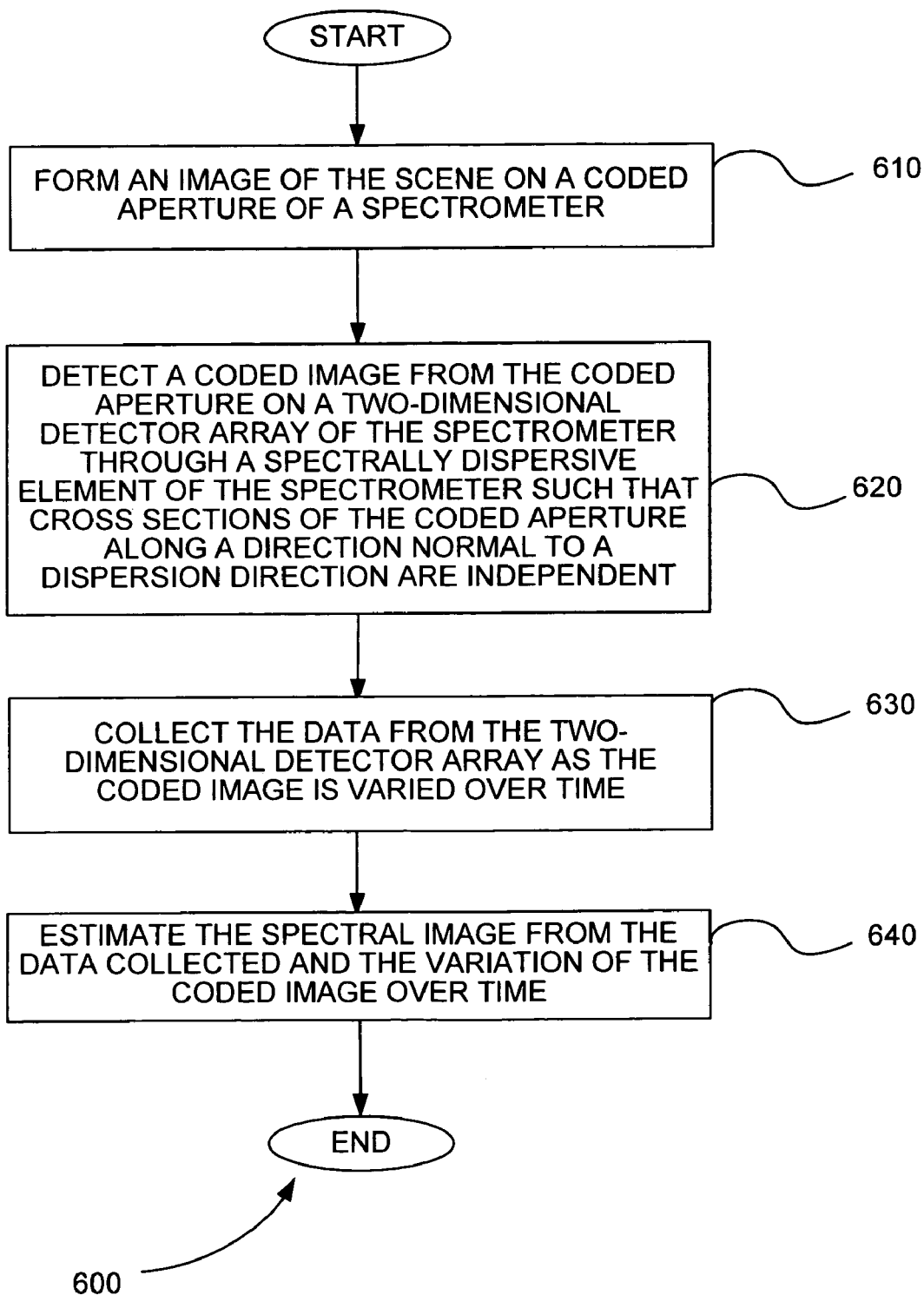
FIG. 6 is a flowchart showing a method for estimating a spectral image of a scene using translation, in accordance with an embodiment of the present invention.

FIG. 6 is a flowchart showing a method 600 for estimating a spectral image of a scene using translation, in accordance with an embodiment of the present invention.

In step 610 of method 600, an image of the scene is formed on a coded aperture of a spectrometer.

In step 620, a coded image from the coded aperture is detected on a two-dimensional detector array of the spectrometer through a spectrally dispersive element of the spectrometer such that cross sections of the coded aperture along a direction normal to a dispersion direction are independent.

In step 630, data from the two-dimensional detector array is collected as the coded image is varied over time.

In step 640, the spectral image is estimated from the data collected and the variation of the coded image over time. The spectral image is estimated by isolating independent spatial and spectral components from the collected data by forming a mathematical inner product between columns of the collected data and an analysis function, for example. The coded image is varied over time by translating the spectrometer relative to the scene, for example.

In another embodiment of method 600, the coded image is varied over time by translating an object in the scene relative to the spectrometer and the spectrometer is stationary.

In another embodiment of method 600, the spectrometer is a spectral imaging microscope and the object is translated using a translation stage under the spectral imaging microscope.

In another embodiment of method 600, the spectrometer is a spectral camera and the coded image is varied over time by slewing the spectrometer relative to the scene.

In another embodiment of method 600, the spectrometer is a static multiplex multimodal spectrometer.

Figure 7:
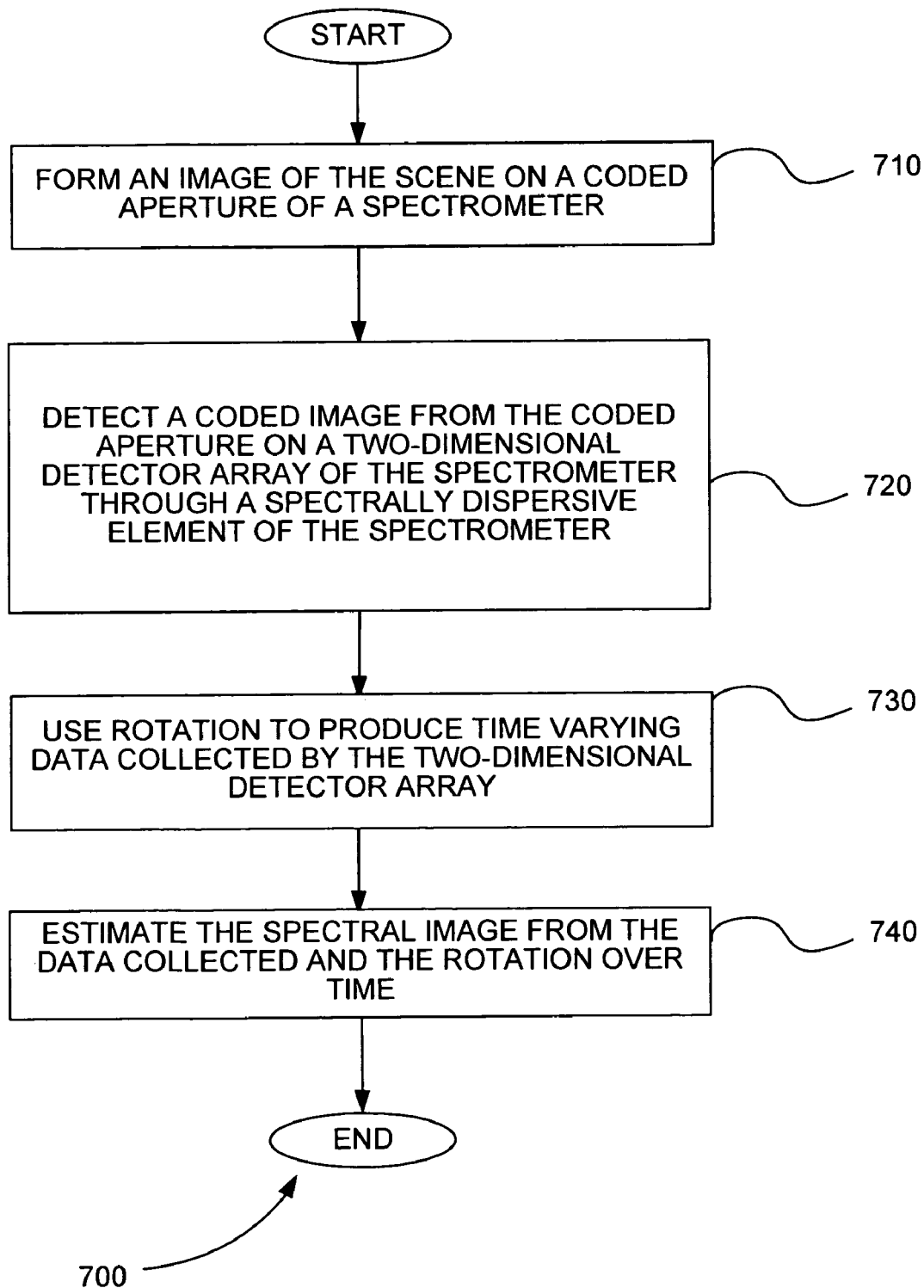
FIG. 7 is a flowchart showing a method for estimating a spectral image of a scene using rotation, in accordance with an embodiment of the present invention.

FIG. 7 is a flowchart showing a method 700 for estimating a spectral image of a scene using rotation, in accordance with an embodiment of the present invention.

In step 710 of method 700, an image the scene is formed on a coded aperture of a spectrometer.

In step 720, a coded image from the coded aperture is detected on a two-dimensional detector array of the spectrometer through a spectrally dispersive element of the spectrometer.

In step 730, rotation is used to produce time varying data collected by the two-dimensional detector array.

In step 740, the spectral image is estimated from the data collected and the rotation over time. The rotation over time is created by rotating the image formed on the coded aperture over time, for example.

In another embodiment of method 700, the rotation over time is created by rotating the coded aperture over time.

In another embodiment of method 700, the rotation over time is created by rotating the dispersive element over time.

In another embodiment of method 700, the rotation over time is created by rotating one or more components of the spectrometer over time. The components of the spectrometer can include, but are not limited to, an optical preprocessor, a coded aperture, a dispersive element, and a two-dimensional detector array. The spectrometer is a static multiplex multimodal spectrometer, for example.

Figure 8:
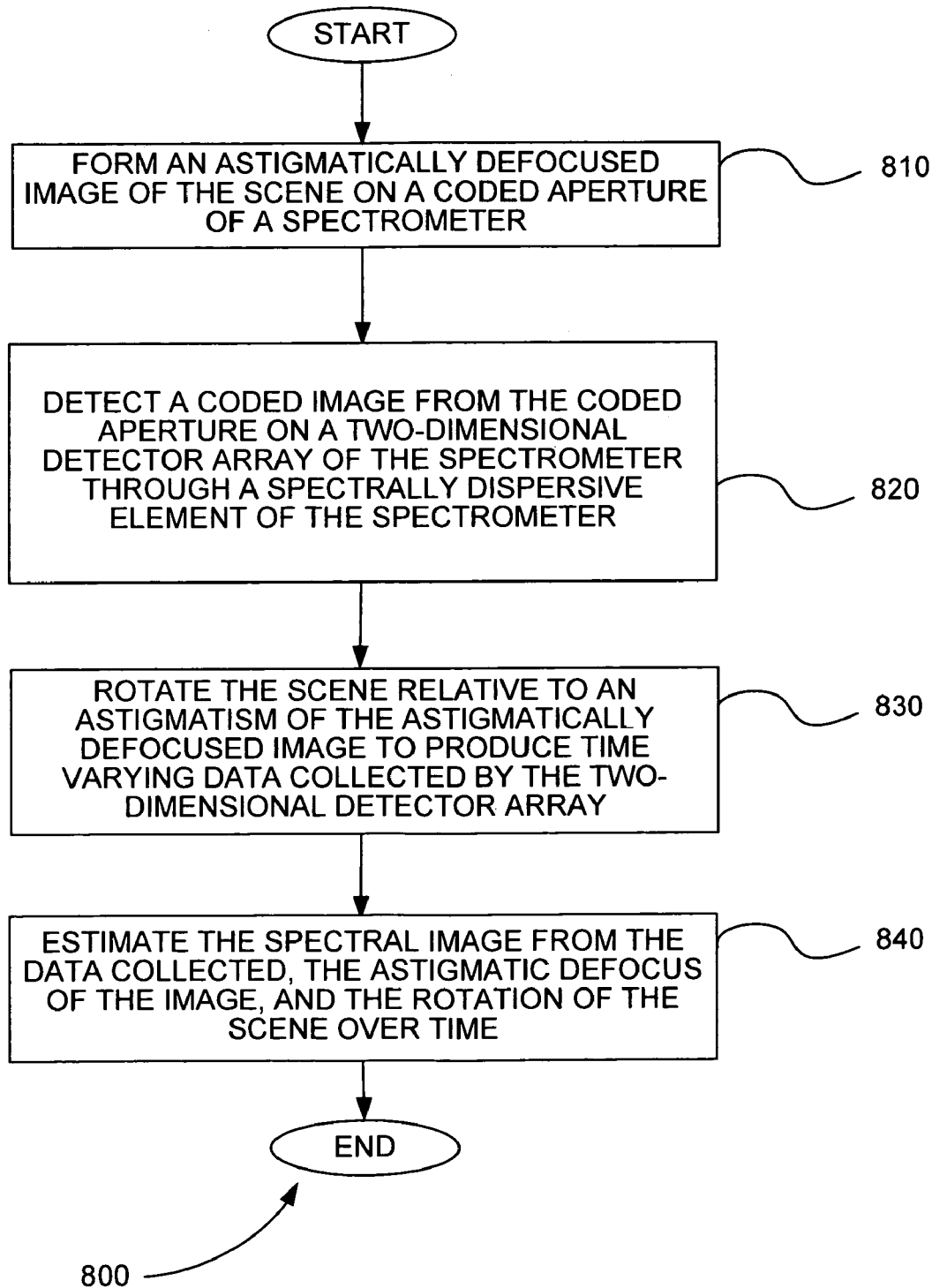
FIG. 8 is a flowchart showing a method for estimating a spectral image of a scene using defocus, in accordance with an embodiment of the present invention.

FIG. 8 is a flowchart showing a method 800 for estimating a spectral image of a scene using defocus, in accordance with an embodiment of the present invention.

In step 810 of method 800, an astigmatically defocused image is formed on a coded aperture of a spectrometer.

In step 820, a coded image from the coded aperture is detected on a two-dimensional detector array of the spectrometer through a spectrally dispersive element of the spectrometer.

In step 830, the scene is rotated relative to an astigmatism of the astigmatically defocused image to produce time varying data collected by the two-dimensional detector array.

In step 840, the spectral image is estimated from the data collected, the astigmatic defocus of the image, and the rotation of the scene over time. The spectral image is estimated by compressive sampling and decompressive inference to estimate the astigmatically defocused image from the data collected and performing an inverse Radon transform on the estimated astigmatically defocused image to estimate the spectral image, for example. The spectrometer is a static multiplex multimodal spectrometer, for example.

Figure 9:
FIG. 9 is a transmission pattern used as a test target with a pushbroom system, in accordance with an embodiment of the present invention.

FIG. 9 is a transmission pattern 900 used as a test target with a pushbroom system, in accordance with an embodiment of the present invention. Pattern 900 is illuminated with monochromatic laser light. The datacube for this source is empty except in a plane corresponding to the laser wavelength. In that plane, the spatial structure is an image of pattern 900.

Figure 10:
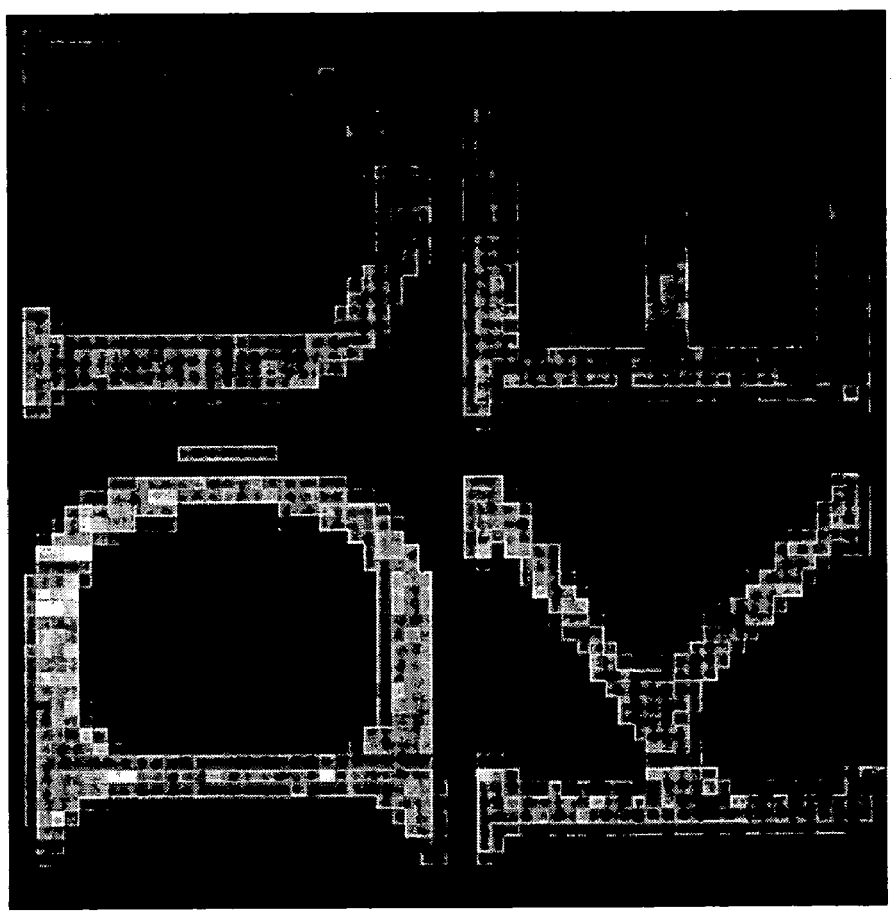
FIG. 10 is a resulting image of transmission pattern using a pushbroom system, in accordance with an embodiment of the present invention.

FIG. 10 is a resulting image 1000 of transmission pattern 900 using a pushbroom system, in accordance with an embodiment of the present invention. Image 1000 is obtained by integrating through a reconstructed datacube along the wavelength axis. Image 1000 is, for example, an intensity image from the datacube. The spatial structure is accurately reproduced.

Figure 11:
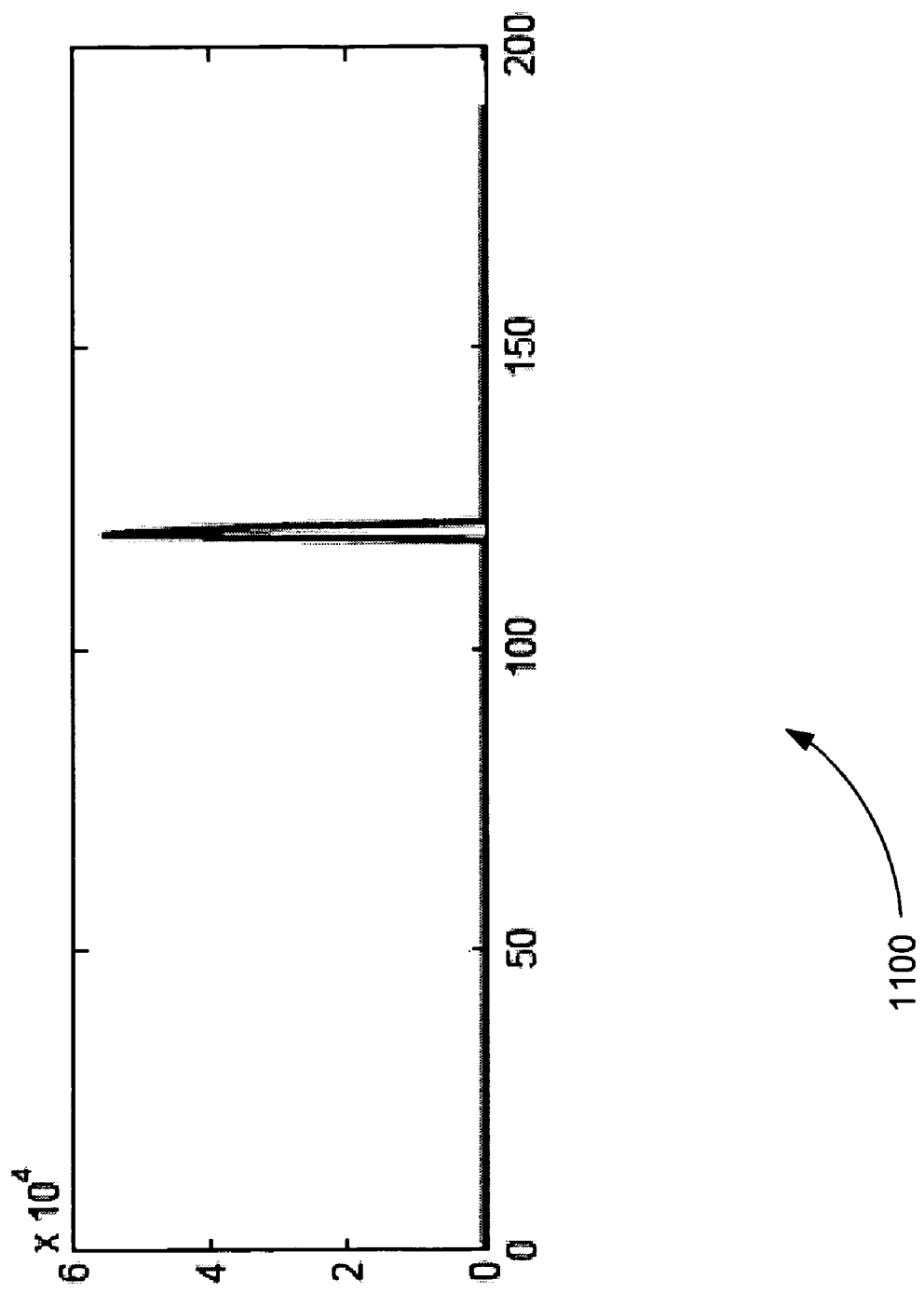
FIG. 11 is a spectral plot of an on pixel from the image of FIG. 10, in accordance with an embodiment of the present invention.

FIG. 11 is a spectral plot 1100 of an on pixel from image 1000, in drilling through the datacube at a spatial location where the pixel is on. Plot 1100 shows a sharp spike corresponding to the laser wavelength.

Figure 12:
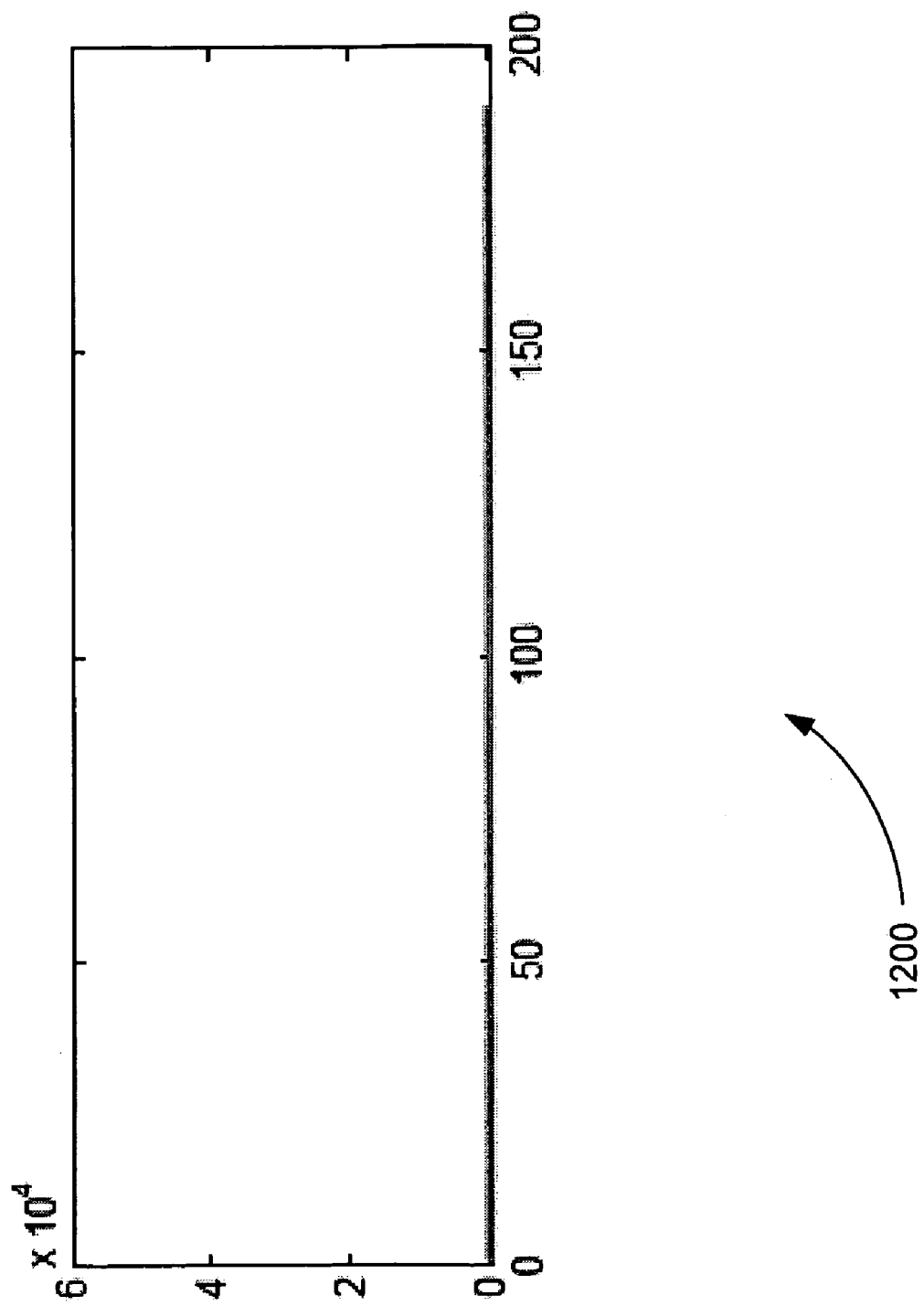
FIG. 12 is a spectral plot of an off pixel from the image of FIG. 10, in accordance with an embodiment of the present invention.

FIG. 12 is a spectral plot 1200 of an off pixel from image 1000, in accordance with an embodiment of the present invention. Plot 1200 is made by drilling through the datacube at a spatial location where the pixel is off. Plot 1100 shows no significant spectral features.

Figure 13:
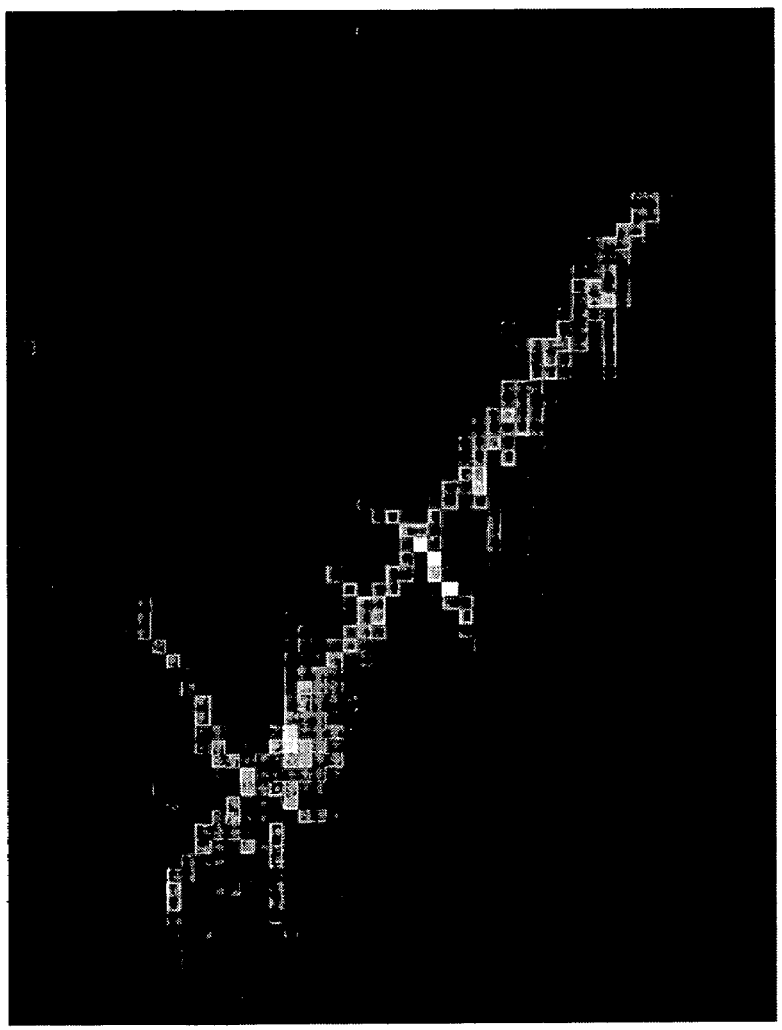
FIG. 13 is a collection of quantum dots used as a test target using a pushbroom system, in accordance with an embodiment of the present invention.

FIG. 13 is a collection of quantum dots 1300 used as a test target using a pushbroom system, in accordance with an embodiment of the present invention.

Figure 14:
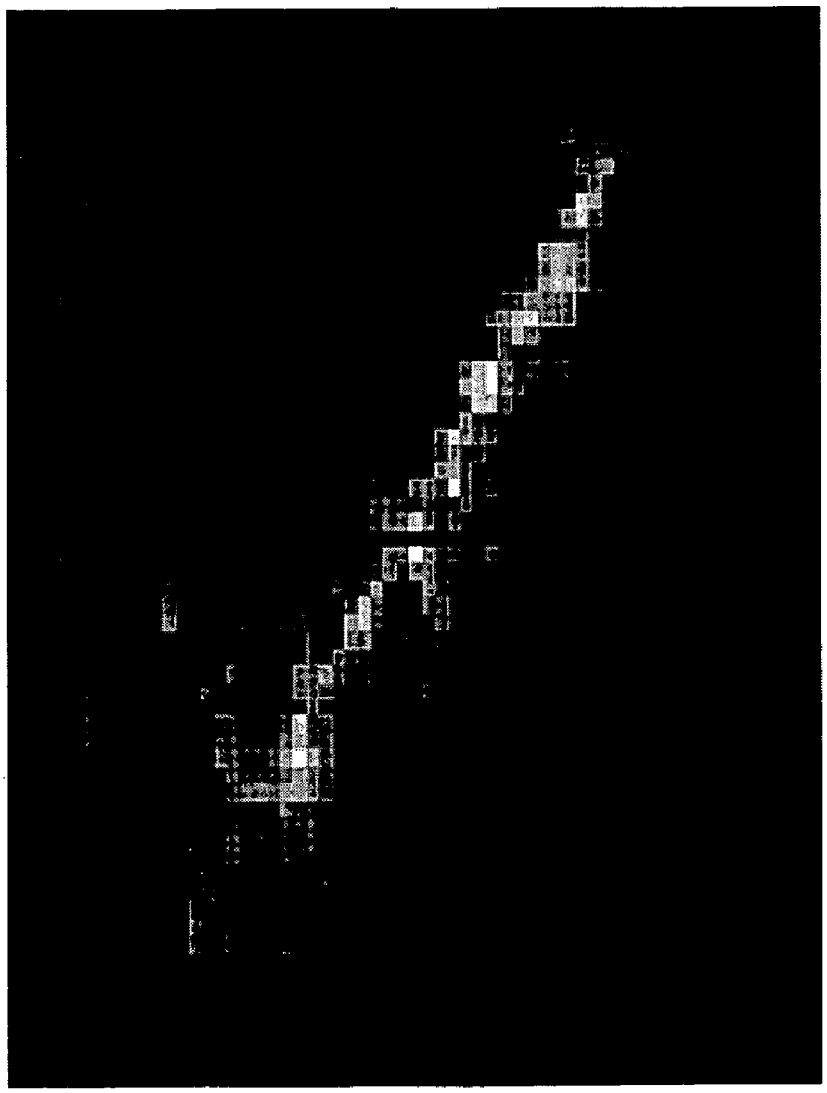
FIG. 14 is a resulting image of quantum dots from FIG. 13 using a pushbroom system, in accordance with an embodiment of the present invention.

FIG. 14 is a resulting image 1400 of quantum dots 1300 using a pushbroom system, in accordance with an embodiment of the present invention. Image 1400 shows the sum through a reconstructed datacube along the wavelength axis. Image 1400 resembles quantum dots 1300.

Figure 15:
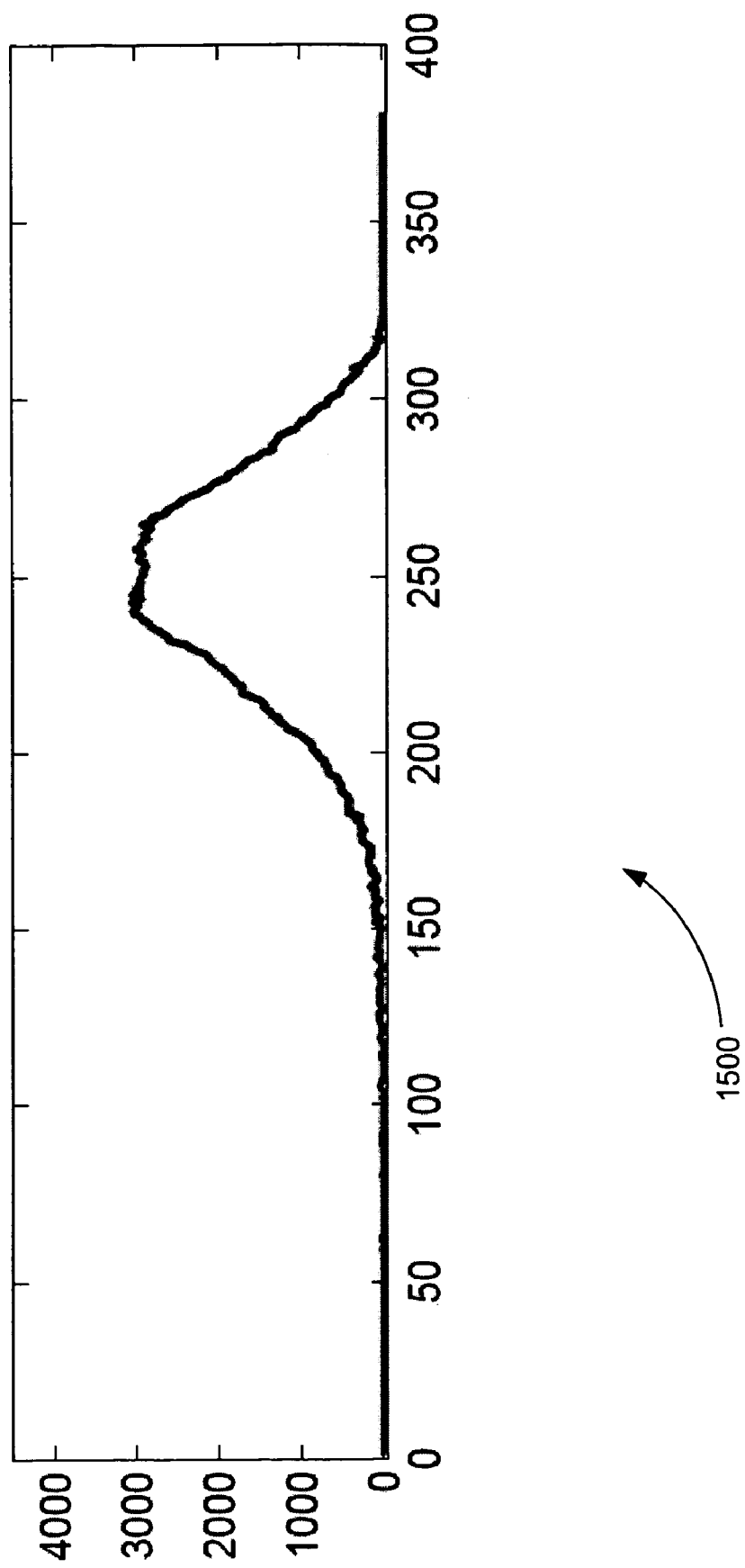
FIG. 15 is a spectral plot of a location on a dot from the image from FIG. 14, in accordance with an embodiment of the present invention.

FIG. 15 is a spectral plot 1500 of a location on a dot from image 1400, in accordance with an embodiment of the present invention. Plot 1500 shows the broad fluorescent features of the dot.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously perform hyperspectral imaging with a high optical efficiency, with a low component and design cost, and without the missing cone problem. Systems and methods in accordance with an embodiment of the present invention disclosed herein can also generate a datacube using fewer measurements than the number of elements in the reconstructed datacube.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for estimating a spectral image of a scene, comprising:

forming an image of the scene on a coded aperture of a spectrometer;

detecting a coded image from the coded aperture on a two-dimensional detector array of the spectrometer through a spectrally dispersive element of the spectrometer such that cross sections of the coded aperture along a direction normal to a dispersion direction are independent;

collecting data from the two-dimensional detector array as the coded image is varied over time; and estimating the spectral image from the data collected and the variation of the coded image over time.

2. The method of claim 1, wherein estimating the spectral image comprises isolating independent spatial and spectral components from the collected data by forming a mathematical inner product between columns of the collected data and an analysis function.

3. The method of claim 1, wherein the coded image is varied over time by translating the spectrometer relative to the scene.

4. The method of claim 1, wherein the coded image is varied over time by translating an object in the scene relative to the spectrometer and the spectrometer is stationary.

5. The method of claim 4, wherein the spectrometer comprises a spectral imaging microscope and the object is translated using a translation stage under the spectral imaging microscope.

6. The method of claim 1, wherein the spectrometer comprises a spectral camera and the coded image is varied over time by slewing the spectrometer relative to the scene.

7. The method of claim 1, wherein the spectrometer comprises a static multiplex multimodal spectrometer.

8. A method for estimating a spectral image of a scene, comprising:

forming an image the scene on a coded aperture of a spectrometer;

detecting a coded image from the coded aperture on a two-dimensional detector array of the spectrometer through a spectrally dispersive element of the spectrometer;

using rotation to produce time varying data collected by the two-dimensional detector array; and estimating the spectral image from the data collected and the rotation over time.

9. The method of claim 8, wherein the rotation comprises rotating the image formed on the coded aperture over time.

10. The method of claim 8, wherein the rotation comprises rotating the coded aperture over time.

11. The method of claim 8, wherein the rotation comprises rotating the dispersive element over time.

12. The method of claim 8, wherein the rotation comprises rotating one or more components of the spectrometer over time.

13. The method of claim 12, wherein components of the spectrometer comprise an optical preprocessor, the coded aperture, the dispersive element, and the two-dimensional detector array.

14. The method of claim 8, wherein the spectrometer comprises a static multiplex multimodal spectrometer.

15. A method for estimating a spectral image of a scene, comprising:
    forming an astigmatically defocused image on a coded aperture of a spectrometer;
    detecting a coded image from the coded aperture on a two-dimensional detector array of the spectrometer through a spectrally dispersive element of the spectrometer;
    rotating the scene relative to an astigmatism of the astigmatically defocused image to produce time varying data collected by the two-dimensional detector array; and
    estimating the spectral image from the data collected, the astigmatic defocus of the image, and the rotation of the scene over time.

16. The method of claim 15, wherein estimating the spectral image comprises using compressive sampling and decompressive inference to estimate the astigmatically defocused image from the data collected and performing an inverse Radon transform on the estimated astigmatically defocused image to estimate the spectral image.

17. The method of claim 15, wherein the spectrometer comprises a static multiplex multimodal spectrometer.

18. A spectral imager, comprising:
    a spectrometer comprising an optical preprocessor, a coded aperture, a spectrally dispersive element, a two-dimensional detector array, and a processor,
        wherein the optical preprocessor forms an image of a scene on the coded aperture,
            wherein a coded image from the coded aperture is detected on the two-dimensional detector array through the spectrally dispersive element such that cross sections of the coded aperture along a direction normal to a dispersion direction are independent, wherein data is collected from the two-dimensional detector array as the coded image is varied over time, and wherein the processor estimates a spectral image of the scene from the data collected and the variation of the coded image over time.

19. The spectral imager of claim 18, wherein the processor estimates the spectral image by isolating independent spatial and spectral components from the collected data by forming a mathematical inner product between columns of the collected data and an analysis function.

20. The spectral imager of claim 18 wherein the coded image is varied over time by translating the spectrometer relative to the scene.

21. The spectral imager of claim 18 wherein the coded image is varied over time by translating an object in the scene relative to the spectrometer and the spectrometer is stationary.

22. The spectral imager of claim 21 wherein the spectrometer comprises a spectral imaging microscope and the object is translated using a translation stage under the spectral imaging microscope.

23. The spectral imager of claim 18 wherein the spectrometer comprises a spectral camera and the coded image is varied over time by slewing the spectrometer relative to the scene.

24. The spectral imager of claim 18 wherein the spectrometer comprises a static multiplex multimodal spectrometer.

25. A spectral imager, comprising:
    a spectrometer comprising an optical preprocessor, a coded aperture, a spectrally dispersive element, a two-dimensional detector array, and a processor,
        wherein the optical preprocessor forms an image of a scene on the coded aperture,
            wherein a coded image from the coded aperture is detected on the two-dimensional detector array through the spectrally dispersive element, wherein rotation is used to produce time varying data collected by the two-dimensional detector array, and wherein the processor estimates a spectral image of the scene from the data collected and the rotation over time.

26. The spectral imager of claim 25 wherein the rotation comprises rotating the image formed on the coded aperture over time.

27. The spectral imager of claim 25 wherein the rotation comprises rotating the coded aperture over time.

28. The spectral imager of claim 25 wherein the rotation comprises rotating the dispersive element over time.

29. The spectral imager of claim 25 wherein the rotation comprises rotating one or more components of the spectrometer over time.

30. The spectral imager of claim 29 wherein components of the spectrometer comprise the optical preprocessor, the coded aperture, the dispersive element, and the two-dimensional detector array.

31. The spectral imager of claim 25 wherein the spectrometer comprises a static multiplex multimodal spectrometer.

32. A spectral imager, comprising:
    a spectrometer comprising an optical preprocessor, a coded aperture, a spectrally dispersive element, a two-dimensional detector array, and a processor,
        wherein the optical preprocessor forms an astigmatically defocused image of a scene on the coded aperture, wherein a coded image from the coded aperture is detected on the two-dimensional detector array of the spectrometer through the spectrally dispersive element, wherein the scene is rotated relative to an astigmatism of the astigmatically defocused image to produce time varying data collected by the two-dimensional detector array, and wherein the processor estimates the spectral image of the scene from the data collected, the astigmatic defocus of the image, and the rotation of the scene over time.

33. The spectral imager of claim 32, wherein the processor estimates the spectral image by using compressive sampling and decompressive inference to estimate the astigmatically defocused image from the data collected and performs an inverse Radon transform on the estimated astigmatically defocused image to estimate the spectral image of the scene.

34. The spectral imager of claim 32, wherein the spectrometer comprises a static multiplex multimodal spectrometer.

* * * * *